(12) United States Patent
Chou et al.

(10) Patent No.: US 9,031,357 B2
(45) Date of Patent: May 12, 2015

(54) RECOVERING DIS-OCCLUDED AREAS USING TEMPORAL INFORMATION INTEGRATION

(75) Inventors: Philip Andrew Chou, Bellevue, WA (US); Cha Zhang, Sammamish, WA (US); Zhengyou Zhang, Bellevue, WA (US); Shujie Liu, Buffalo, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 13/463,934

(22) Filed: May 4, 2012

(65) Prior Publication Data
US 2013/0294710 A1     Nov. 7, 2013

(51) Int. Cl.
*G06K 9/32*     (2006.01)
*G06T 7/00*     (2006.01)

(52) U.S. Cl.
CPC ........... *G06K 9/32* (2013.01); *G06T 7/0075* (2013.01)

(58) Field of Classification Search
CPC ...... G06K 9/00; G06K 2009/363; G06T 3/00; G06T 3/0093
USPC ......................... 382/293, 276, 215
See application file for complete search history.

(56) References Cited

U.S. PATENT DOCUMENTS

| | | | | |
|---|---|---|---|---|
| 5,999,662 | A * | 12/1999 | Burt et al. | 382/284 |
| 6,157,747 | A * | 12/2000 | Szeliski et al. | 382/284 |
| 6,269,175 | B1 * | 7/2001 | Hanna et al. | 382/107 |
| 6,476,803 | B1 * | 11/2002 | Zhang et al. | 345/419 |
| 7,440,615 | B2 * | 10/2008 | Gong et al. | 382/173 |
| 7,657,848 | B2 * | 2/2010 | Yakowenko et al. | 715/853 |
| 8,320,620 | B1 * | 11/2012 | Cohen | 382/103 |
| 8,554,016 | B2 * | 10/2013 | Manson | 382/294 |
| 8,578,579 | B2 * | 11/2013 | Rangarajan et al. | 29/402.01 |

(Continued)

FOREIGN PATENT DOCUMENTS

| | | | |
|---|---|---|---|
| EP | WO 2012/010220 | * | 1/2012 |
| WO | WO 2012/012582 | * | 1/2012 |

OTHER PUBLICATIONS

A Criminisi, J. Shotton, A. Blake, C. Rother, and P.H.S. Torr, "Efficient dense stereo with occlusions by four-state dynamic programming.",IJCV, 2006.*

(Continued)

*Primary Examiner* — Stephen R Koziol
*Assistant Examiner* — Shaghayegh Azima
(74) *Attorney, Agent, or Firm* — Steve Wight; Peter Taylor; Micky Minhas

(57) ABSTRACT

A temporal information integration dis-occlusion system and method for using historical data to reconstruct a virtual view containing an occluded area. Embodiments of the system and method use temporal information of the scene captured previously to obtain a total history. This total history is warped onto information captured by a camera at a current time in order to help reconstruct the dis-occluded areas. The historical data (or frames) from the total history match only a portion of the frames contained in the captured information. This warping yields warped history information. Warping is performed by using one of two embodiments to match points in an estimation of the current information to points in the captured information. Next, regions of current information are split using a classifier. The warped history information and the captured information then are merged to obtain an estimate for the current information and the reconstructed virtual view.

20 Claims, 11 Drawing Sheets

(56) References Cited

U.S. PATENT DOCUMENTS

| | | | | |
|---|---|---|---|---|
| 2003/0231175 | A1* | 12/2003 | Pfister et al. | 345/419 |
| 2004/0240746 | A1* | 12/2004 | Aliaga et al. | 382/243 |
| 2005/0226531 | A1* | 10/2005 | Silverstein et al. | 382/284 |
| 2006/0017722 | A1 | 1/2006 | Hong et al. | |
| 2008/0094498 | A1* | 4/2008 | Mori | 348/352 |
| 2010/0135400 | A1* | 6/2010 | Bernard et al. | 375/240.16 |
| 2010/0303302 | A1* | 12/2010 | Kipman et al. | 382/107 |
| 2012/0136580 | A1* | 5/2012 | Kale et al. | 702/19 |
| 2012/0188409 | A1* | 7/2012 | Gallagher et al. | 348/239 |
| 2012/0307155 | A1* | 12/2012 | Gleicher et al. | 348/581 |
| 2013/0010067 | A1* | 1/2013 | Veeraraghavan et al. | 348/46 |
| 2013/0121416 | A1* | 5/2013 | He et al. | 375/240.14 |
| 2013/0169748 | A1* | 7/2013 | Corral-Soto | 348/43 |

OTHER PUBLICATIONS

ZhengYou Zhang, "Iterative Point Matching for Registration of Free-Form Curves and Surfaces", international journal of computer vision, Mar. 1994.*

Cheng, et al., "Spatio-Temporally Consistent Novel View Synthesis Algorithm From Video-Plus-Depth Sequences for Autostereoscopic Displays", Retrieved at <<http://ieeexplore.ieee.org/stamp/stamp.jsp?arnumber=05759726>>, Proceedings: IEEE Transactions on Broadcasting, May 23, 2011, pp. 523-532.

Lee, et al., "Discontinuity-adaptive Depth Map Filtering for 3D View Generation", Retrieved at <<http://hci.iwr.uni-heidelberg.de/MIP/Teaching/3D-filme/paper/a8-lee.pdf>>, Proceedings: Proceedings of the 2nd International Conference on Immersive Telecommunications (IMMERSCOM '09), May 27-29, 2009, pp. 6.

Tauber, et al., "Review and Preview: Disocclusion by Inpainting for Image-Based Rendering", Retrieved at <<http://ieexplore.ieee.org/stamp/stamp.jsp?tp=&arnumber=4252259>>, Proceedings: IEEE Transactions on Systems, Man, and Cybernetics, Part C: Applications and Reviews, Jun. 25, 2007, pp. 527-540.

Lee, et al., "Generation of high-quality depth maps using hybrid camera system for 3-D video", Retrieved at <<http://vclab.gist.ac.kr/papers/01/2011/JVCI_eklee_final.pdf>>, Oct. 25, 2010, pp. 73-84.

Mark, et al., "Post-Rendering 3D Warping", Retrieved at <<http://citeseerx.ist.psu.edu/viewdoc/download?doi=10.1.1.13.1789&rep=rep1&type=pdf>>, Proceedings of Symposium on Interactive 3D Graphics Apr. 27-30, 1997, pp. 7-16.

Wang, et al., "Depth Image Segmentation for Improved Virtual View Image Quality in 3-DTV", Retrieved at <<http://www.jdl.ac.cri/doc/2007/depth%20image%20segmentation%20for%20improved%20virtual%20view%20image%20quality%20in%203-dtv.pdf>>, Proceedings of International Symposium on Intelligent Signal Processing and Communication Systems, Dec. 1, 2007, pp. 784-787.

Smolic, et al., "3D Video and Free Viewpoint Video—Technologies, Applications, and MPEG Standards", Retrieved at <<http://ieeexplore.ieee.org/stamp/stamp.jsp?tp=&arnumber=4037061>>, Proceedings: In IEEE International Conference on Multimedia and Expo, Jul. 9, 2006, pp. 2161-2164.

Zitnick, et al., "High-Quality Video View Interpolation Using a Layered Representation", Retrieved at <<http://www.cs.sfu.ca/CourseCentral/820/li/material/source/papers/Layered-video-TOG-2004.pdf>>, In Proceedings of ACM SIGGRAPH, vol. 23, Issue 3, Aug. 2004, pp. 600-608.

Moezzi, et al., "Virtual View Generation for 3D Digital Video", Retrieved at <<http://ieeexplore.ieee.org/stamp/stamp.jsp?tp=&arnumber=580392>>, Proceedings: In IEEE MultiMedia, vol. 4, Issue 1, Jan. 1997, pp. 18-26.

Petit, et al., "Multicamera Real-Time 3D Modeling for Telepresence and Remote Collaboration", Retrieved at <<http://citeseerx.ist.psu.edu/viewdoc/download;jsessionid=7D54F9CB133EF2DA234508A750636C2C?doi=10.1.1.165.3962&rep=rep1&type=pdf>>, Proceedings: In International Journal of Digital Multimedia Broadcasting, Dec. 2010, pp. 1-12.

Debevec, et al., "Modeling and Rendering Architecture from Photographs: A Hybrid Geometry-and Image-Based Approach", Retrieved at <<http://citeseerx.ist.psu.edu/viewdoc/download?doi=10.1.1.22.4036&rep=rep1&type=pdf>>, Proceedings: In Proceedings of the 23rd Annual Conference on Computer Graphics and Interactive Techniques, Aug. 4, 1996, pp. 11-20.

Zhang, Zhengyou., "Iterative Point Matching for Registration of Free-Form Curves and Surfaces", Retrieved at <<http://citeseer.ist.psu.edu/viewdoc/download;jsessionid=85C6D642164923EFE4C45B7AF8768EDD?doi=10.1.1.175.770&rep=rep1&type=pdf>>, In Proceedings of International Journal of Computer Vision, vol. 13, Issue 2, Oct. 1994, pp. 119-152.

Feldmar, et al., "Locally Affine Registration of Free-Form Surfaces", Retrieved at <<http://ieeexplore.ieee.org/stamp/stamp.jsp?tp=&arnumber=323872>>, In Proceedings of Computer Vision and Pattern Recognition, Jun. 21, 1994, pp. 496-501.

Delamarre, et al., "3D Articulated Models and Multi-view Tracking with Physical Forces", Retrieved at <<http://citeseerx.ist.psu.edu/viewdoc/download?doi=10.1.1.28.5304&rep=rep1&type=pdf>>, Proceedings: In Computer Vision and Image Understanding—Modeling People Toward Vision-based Understanding of a Person's Shape, Appearance and Movement, vol. 81, Issue 3, Mar. 2001, pp. 328-357.

Urtasun, et al., "3D Human Body Tracking using Deterministic Temporal Motion Models", Retrieved at <<http://cvlab.epfl.ch/publications/publications/2004/UrtasunF04a.pdf>>, Proceedings: In European Conference on Computer Vision, May 11, 2004, pp. 14.

Chai, et al., "Plenoptic Sampling", Retrieved at <<http://users.isr.ist.utl.pt/~aguiar/chai.pdf>>, In Proceedings of the 27th Annual Conference on Computer Graphics and Interactive Techniques, Jul. 23, 2000, pp. 307-318.

Muller, et al., "3-D Video Representation Using Depth Maps", Retrieved at <<http://ieeexplore.ieee.org/stamp/stamp.jsp?tp=&arnumber=5668523>>, In Proceedings of the IEEE, vol. 99, No. 4, pp. 643-656.

Smolic, et al., "An Overview of Available and Emerging 3D Video Formats and Depth Enhanced Stereo as Efficient Generic Solution", Retrieved at <<http://ieeexplore.ieee.org/stamp/stamp.jsp?tp=&arnumber=5167358>>, Proceedings: In Picture Coding Symposium, May 8, 2009, pp. 1-4.

Cai, et al., "3D Deformable Face Tracking with Commodity Depth Cameras", Retrieved at <<http://137.189.97.85/2008/eccv10_ChaZhang.pdf>>, In Proceedings of the 11th European Conference on Computer Vision Conference on Computer Vision: Part III, Sep. 2010, pp. 229-242.

Fehn, Christoph et al.; "Interactive 3-DTV—Concepts and Key Technologies;" Proceedings of the IEEE, vol. 94, No. 3; Mar. 2006; pp. 524-538.

Suzuki, Kazuyoshi; "Software for view synthesis;" Jun. 27, 2008; 6 pages.

* cited by examiner

RECOVERING DIS-OCCLUDED AREAS USING TEMPORAL INFORMATION INTEGRATION

BACKGROUND

In tele-immersive conferencing a subject is captured by a fixed set of cameras. This camera data then is transmitted to a remote site, and a viewer at the remote site sees the subject in real time from a moving virtual viewpoint. The view at this moving virtual viewpoint is reconstructed from the views of the fixed set of cameras. At any given time, various surfaces of the subject that are visible from the virtual viewpoint may not be visible to any of the cameras. This can make reconstruction of the view of those surfaces difficult.

It becomes desirable to reconstruct virtual views because at each site there are one or more depth color cameras capturing the scene, while remote users could view the scene from a different viewpoint. This reconstruction or restoration process is called dis-occlusion since the areas visible to the viewpoint of a remote user may be occluded to the cameras. Various techniques exist to reconstruct virtual views from a moving virtual viewpoint by filling dis-occluded areas. One class of techniques fits a captured frame into a model and then fills the dis-occluded areas. Another class of techniques uses multiple cameras to capture the scene from different positions. However, none of these techniques address the temporal aspect of virtual view reconstruction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the temporal information integration dis-occlusion system and method use historical data to help reconstruct a virtual view containing an occluded area. A canonical scenario is the capture of a non-rigid object (such as a human subject) by a single frontal depth color camera. A view of the object from the side requires reconstruction of surfaces, called dis-occluded areas, not seen by the frontal camera at that time. However, those surfaces may have been seen by the frontal camera at some time in the past, such as when the object turned. Embodiments of the temporal information integration dis-occlusion system and method use temporal information from the past and warp this previous data onto the current data in order to help reconstruct the dis-occluded areas.

Embodiments of the temporal information integration dis-occlusion system and method include capturing information with the camera of a non-rigid object in the scene. A total history is used to provide the temporal information. In particular, temporal information from the past is a temporal history of the captured information and is also called the "total history." The total history is temporal history of captured information that was captured in previous time periods. The historical data (or frames) from the total history match only a portion of the frames contained in the captured information. In general, the total history is any information that is observed from the scene in the past. This includes information captured from the same camera, from other cameras, and from any models of the scene.

The entire amount of historical data in the total history then is warped onto the captured information using a hierarchical transformation. This yields warped history information. This warping is performed by first matching points in an estimation of the current information to points in the captured information. One of two embodiments may be used in the matching process. Both embodiments of the matching process find a set of matched pairs of points, update a matching distance threshold, and then update the transformation based on the matched pairs. The second embodiment takes an average over a set of closer points, which is useful when dealing with noisy data.

Another part of the warping is splitting the regions of current information into matched points and unmatched points using a classifier. The general idea is to determine matched and unmatched regions, partition them into several child nodes if desired, and then perform refinement on each region. The warped history information and the captured information then are merged to obtain an estimate for the current information. The total history then is updated with the current information and the current information is output. The current information is a reconstructed view of the scene such that the previously-occluded areas now may be seen from a virtual viewpoint.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a temporal information integration dis-occlusion system and method reference is made to the accompanying drawings, which form a part thereof, and in which is shown by way of illustration a specific example whereby embodiments of the temporal information integration dis-occlusion system and method may be practiced. It is to be understood that other embodiments may be utilized and structural changes may be made without departing from the scope of the claimed subject matter.

I. System Overview

Embodiments of the temporal information integration dis-occlusion system and method integrate temporal information (such as historical data) to help reconstruct a virtual view. The system and method warp the historical data onto the current data in order to help reconstruct any dis-occluded areas.

Figure 1:
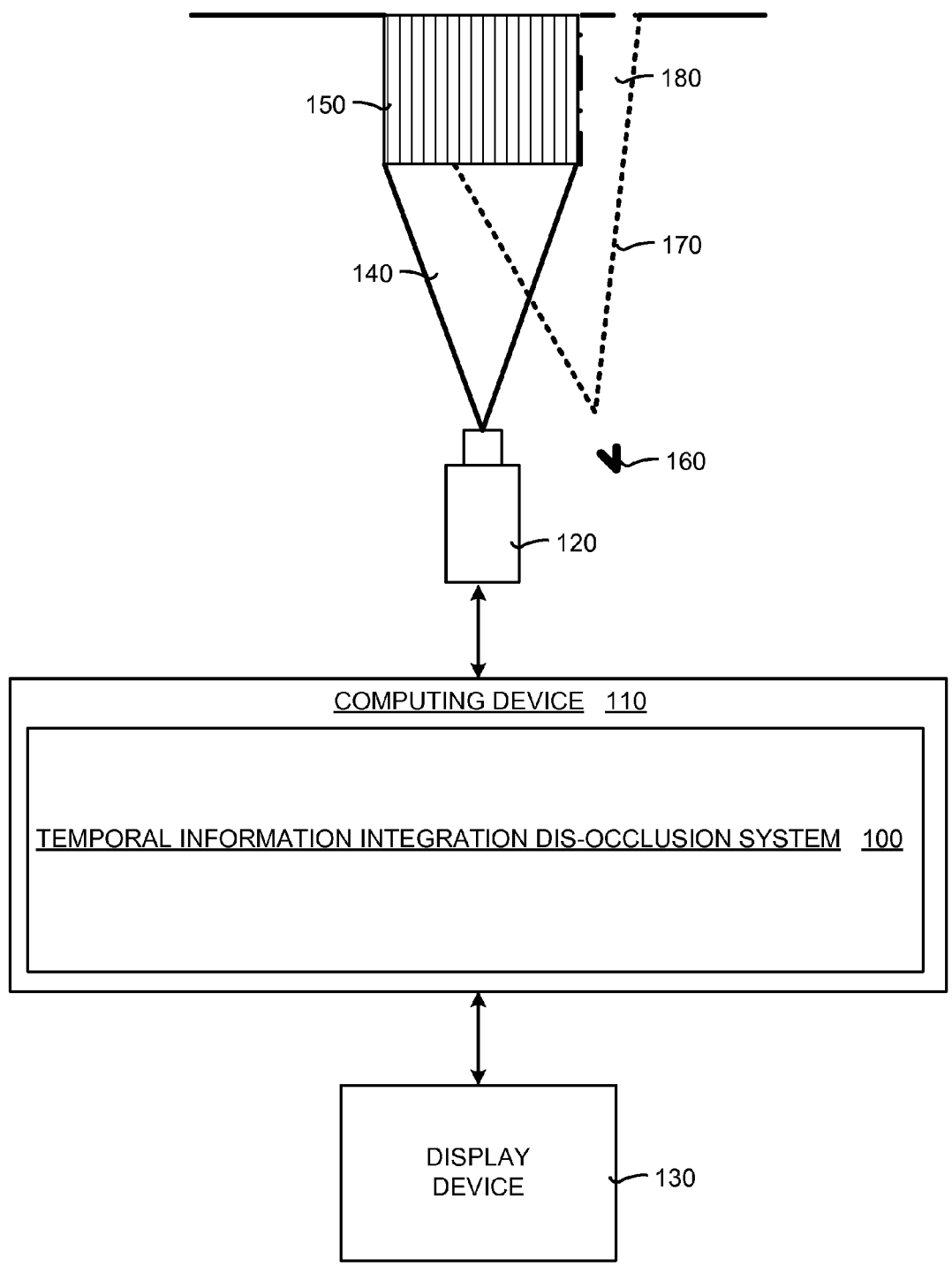
FIG. 1 is a block diagram illustrating a general overview of embodiments of the temporal information integration dis-occlusion system and method implemented in a computing environment.

FIG. 1 is a block diagram illustrating a general overview of embodiments of the temporal information integration dis-occlusion system 100 and method implemented in a computing environment. In particular, embodiments of the temporal information integration dis-occlusion system 100 and method are shown implemented on a computing device 110. The computing device 110 may be any device that contains a processor, such as a desktop computer, notebook computer, and mobile phone.

Embodiments of the temporal information integration dis-occlusion system 100 and method include a single-depth color camera 120 in communication with the computing device 110. The images captured by the camera 120 may be displayed on a display device 130. The display device 130 also is in communication with the computing device 110.

Also shown in FIG. 1 is an example of a dis-occluded area. As shown in FIG. 1, the camera 120 has a first field of view 140 of a scene 150. A remote viewer 160 (shown by the "V" in FIG. 1) may have a viewing position having a second field of view 170. The first field of view 140 and the second field of view 170 are different because the capture position (the location of the camera 120) and the corresponding first field of view 140 and the viewing position (the location of the remote viewer 160) and the corresponding second field of view 170 are different. Due to this difference a dis-occluded area 180 can exist.

Figure 2:
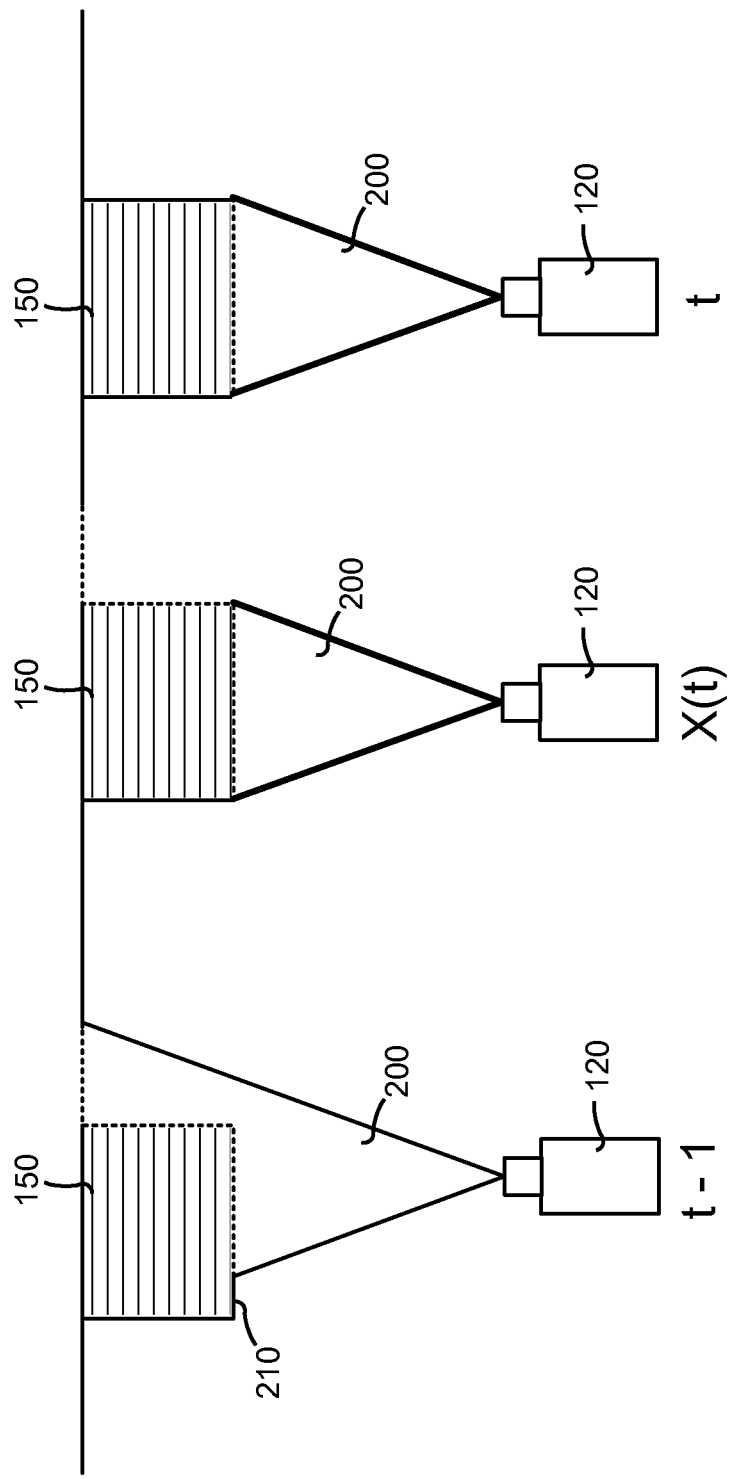
FIG. 2 is an example of how embodiments of the temporal information integration dis-occlusion system and method use temporal information to fill dis-occluded areas.

FIG. 2 is an example of how embodiments of the temporal information integration dis-occlusion system 100 and method use temporal information to fill dis-occluded areas. As shown in FIG. 2, information is captured by the camera 120 of the scene 150 at time t−1. The camera has a third field of view 200. There is a dis-occluded area 210 at time t−1 that is not captured by the camera 120 within its third field of view 200.

At time t, the camera 120 has captured the dis-occluded area 210 that existed at time t−1. As explained in detail below, embodiments of the temporal information integration dis-occlusion system 100 and method combine the information captured at times t−1 and t to obtain information about the scene 150, as shown in X(t). This use of temporal information to alleviate dis-occluded areas provides additional knowledge of the scene 150.

Figure 3:
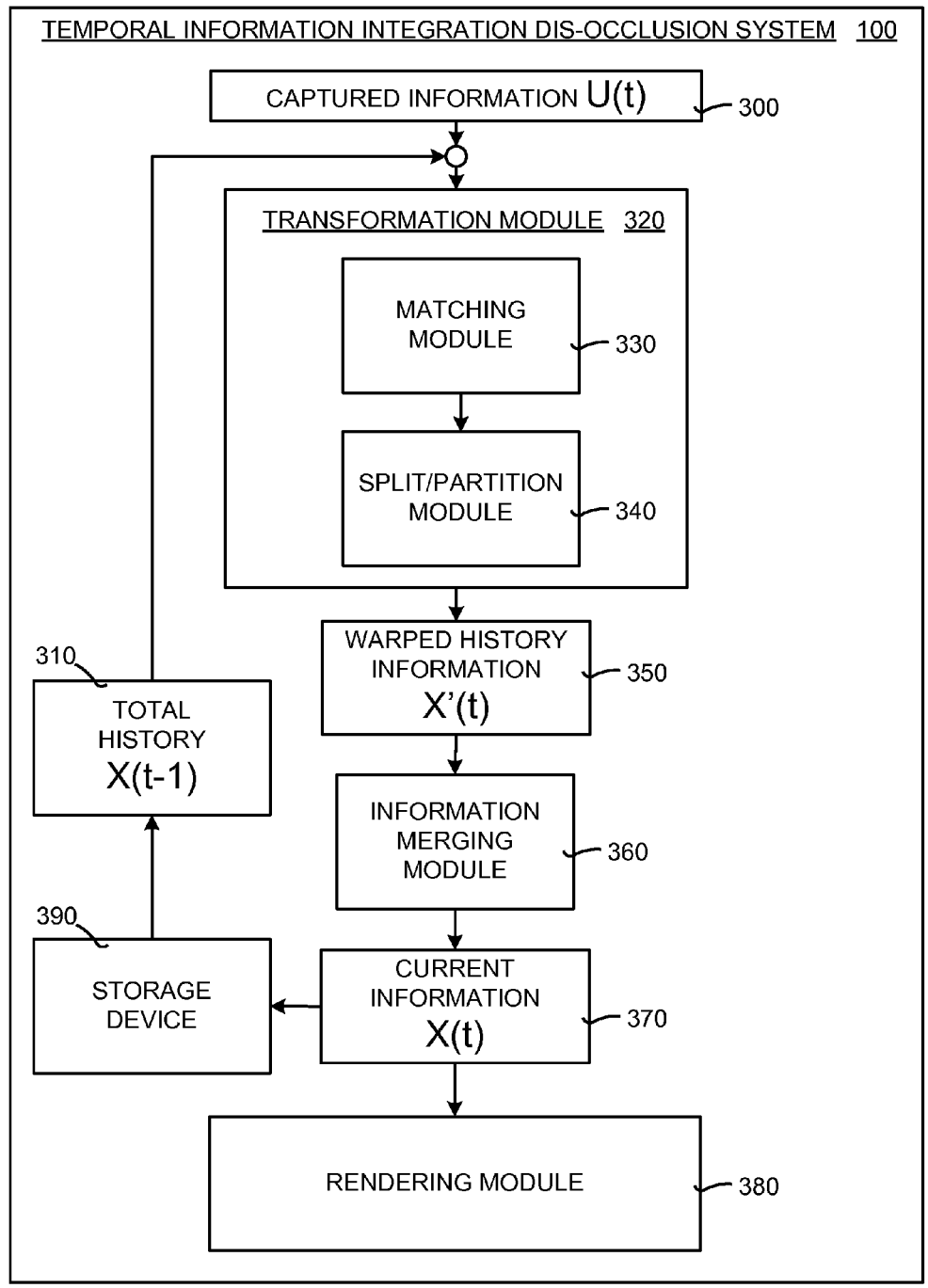
FIG. 3 is a block diagram illustrating an overview of embodiments of the temporal information integration dis-occlusion system shown in FIG. 1.

FIG. 3 is a block diagram illustrating an overview of embodiments of the temporal information integration dis-occlusion system 100 shown in FIG. 1. As shown in FIG. 3, input to embodiments of the system 100 is captured information 300 at time t, designated as U(t). Also input to embodiments of the system 100 is a total history 310 (or history information), designated as X(t−1). Both the captured information and the total history are input to a transformation module 320.

The transformation module 320 includes a matching module 330 and a split/partition module 340. At time t, the matching module 330 estimates a match between the captured information 300 and the total history 310. Moreover, the split/partition module 340 takes the estimated matches and determines actual matched and unmatched regions.

The output from the transformation module 320 is warped history information 350, designated at X'(t). This generates a warping from the total history (X(t−1)) to the captured information (U(t)) as the warped history information (X'(t)). An information merging module 360 is used to merge points in a same grid. The result is current information 370, designated as X(t).

Embodiments of the system 100 render the current information 370 generated from the total history 310 and the captured information 300 using a rendering module 380. The current information is stored on a storage device 390 and added to the total history 310. The updated total history is used as input to embodiments of the system 100 at a subsequent time interval.

II. Operational Overview

Figure 4:
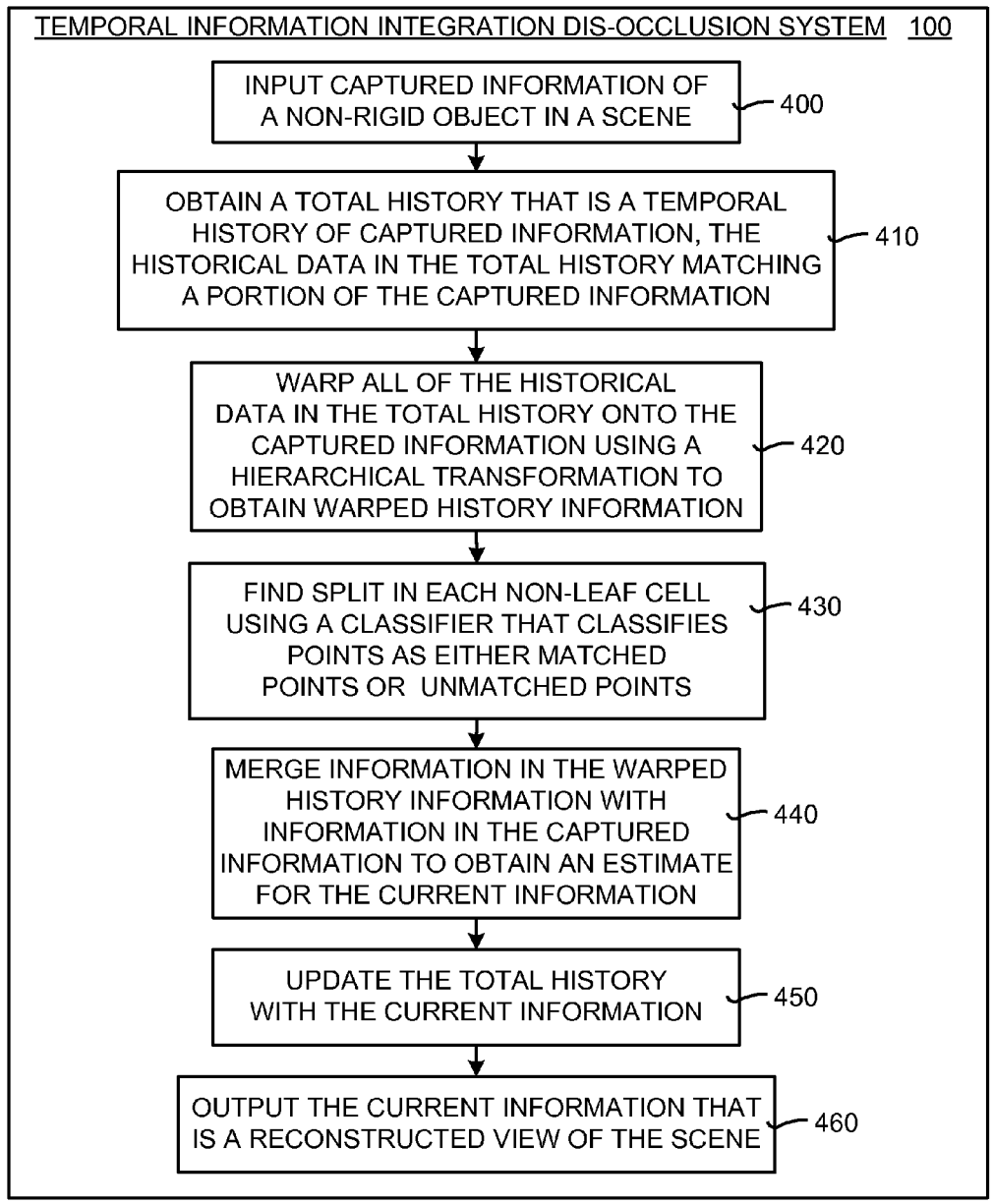
FIG. 4 is a flow diagram illustrating the general operation of embodiments of the temporal information integration dis-occlusion system and method shown in FIGS. 1 and 3.

FIG. 4 is a flow diagram illustrating the general operation of embodiments of the temporal information integration dis-occlusion system 100 and method shown in FIGS. 1 and 3. As shown in FIG. 4, the operation of embodiments of the temporal information integration dis-occlusion method begins inputting captured information of a non-rigid object in a scene (box 400). The information is captured by the camera 120. In some embodiments, the camera 120 is a Kinect® depth camera that produces a depth map and a color map. Kinect® is a registered trademark of Microsoft Corporation in Redmond, Wash. Typically, the non-rigid object is a person, such as when embodiments of the method are used for teleconferencing.

In particular, embodiments of the temporal information integration dis-occlusion method assume that each frame of data in the captured information is composed of a geometry component and a color texture component. In some embodiments, however, there may be other representations for the geometry and texture components of a frame, such as textured meshes or point clouds, produced by other types of sensors.

Each frame in the captured information captured at time t is denoted by U(t). Embodiments of the temporal information integration dis-occlusion method are presented with a temporal sequence of captured frames U(0), U(1), . . . , U(t). Embodiments of the method produce a corresponding sequence of frames (or the current information denoted as X(0), X(1), . . . , X(t)), which have fewer unknown dis-occluded areas than the captured frames. This makes these current information frames more suitable for rendering from an off-axis viewpoint as compared to the captured frames in the captured information.

Embodiments of the temporal information integration dis-occlusion method obtain a total history of information (or frames) captured by the camera 120 (box 410). This total history contains historical data of the frames that were captured. In nearly all cases the historical data matches only a small portion of the captured information. This means that only a small number of frames in the total history of prior captured information match the frames in the current captured information.

It should be noted that the frames in the captured information, U(t), and in the current information, X(t), may use different representations. For example, the captured information may use of a depth map and a color map as mentioned above, while the current information may use of a point cloud with colors or patches attached to each point. In some sense, the current information is the underlying state of the subject, while the captured information is a noisy observation of that state. Embodiments of the method seek to recover an estimate of the current information (or underlying state), X(t), from the captured information (or current observation), U(t), and an estimate of the total history, designated as X(t−1).

Embodiments of the temporal information integration dis-occlusion method next warp all of the historical data in the total history onto the captured information using a hierarchical transformation to obtain a warped history information (box 420). In other words, warping of the historical data onto the current data is performed that covers the whole domain of the historical data. This is true even though the historical data matches the current data over only a small part of its domain.

Embodiments of the temporal information integration dis-occlusion method estimate the current information, X(t), by first warping the total history, X(t−1), onto the captured information, U(t), creating a warped history information X'(t), which is registered to U(t). This is the problem of non-rigid object alignment or registration, a common problem in image processing and computer vision. One example application is matching a two-dimensional (2D) or three-dimensional (3D) image of a diseased organ onto a normal organ. The difference between the problem described in this document and most other problems in non-rigid object alignment is that only a small part of the total history, X(t−1), may be matchable to the captured information, U(t). However, embodiments of the method warp all of the total history onto the captured information.

The desire is to warp the total history onto the captured information without tearing or other drastic deformation. Some previous work addresses this problem by attributing some degree of rigidity to the total history, so that if one portion of it is warped onto the captured information the rest of it will follow. However, this is awkward, as it attributes a physical model to the total history, which may be hard to deduce and compute. Embodiments of the temporal information integration dis-occlusion method address this problem in a different manner, by finding a smooth warping over the domain of definition of the total history. This accurately warps onto the captured information the portion of the total history that is matchable to the captured information. The remainder of the total history follows by the smoothness of the warping. The warping can be regarded as the most likely warping (according to a prior on all warpings) consistent with the observation of the captured information. Alternatively, the warped history information can be regarded as the most likely prediction of the current information given the warped history information and the captured information.

As explained in detail below, the warping is a hierarchical transformation, which is a hierarchical partition of the domain of the history information, such that a split is assigned to each non-leaf cell of the partition and a rigid (or affine) transformation is assigned to each leaf cell of the partition. The rigid (or affine) transformation in each leaf cell is found using a modified Iterative Closest Point (ICP) algorithm.

The split in each non-leaf cell of the partition is found using a classifier that classifies points as either matched or unmatched (box 430). In general, regions of a partition are split if there are enough points in the region and no single rigid (or affine) transformation is good for all the points in the region. The direction of the split is determined by a classifier that discriminates between points in the warped history information, X(t−1), that are matched with points in the captured information, U(t), from points that are unmatched.

Next, embodiments of the method merge information in the warped history information with information in the captured information (box 440). This produces an estimate for the current information. In particular, once the warping is found, and applied to the total history to produce the warped history information, then the current information, X(t), is estimated by merging the warped history information (the estimate), X'(t), with the captured information (the observation), U(t).

The total history then is updated with the current information (box 450). In addition, the output is the current information that is a reconstructed virtual view of the scene, and includes any occluded areas (now called dis-occluded areas) in the original scene) (box 460). This overall process is iterated at each time step.

III. Operational Details

The operational details of embodiments of the temporal information integration dis-occlusion system 100 and method will now be discussed. This includes the operation of embodiments of the transformation module 320, the matching module 330, the split/partition module 340, and the information merging module 350. Moreover, the mathematical details of embodiments of these modules will be presented.

III.A. Surface Representation

Embodiments of the temporal information integration dis-occlusion system 100 and method use representations for the total history 310 and the captured information 300. In particular, a point cloud representation is used, where each point has a spatial index (x,y,z) and color information (r,g,b). In addition, in some embodiments of the system 100 and method neighborhood information for each point is used, such as in a mesh or depth map.

For the total history, each point is also associated with weight and mass parameters. These parameters indicate a confidence of a particular point and number of frames in which the point has appeared. This information is used by embodiments of the system 100 and method when reconstructing the dis-occluded areas.

III.B. Transformation Module

Embodiments of the transformation module 320 use a hierarchical transformation model to describe the warping from the total history 310 to the captured information 300. A hierarchical transformation model is used for several reasons. First, if it becomes necessary to transmit the transformation model, a hierarchical structure provides a more compact representation of the warping as compared to other structures. Note that for a large area having the same motion a single transformation matrix typically is enough.

Second, the hierarchical transformation module typically provides a smoother warping with less error, especially when using a large area to estimate the matching. Third, one part of mapping from the total history 310 to the captured information 300 is to correctly warp dis-occluded points (or missing points in the captured information 300) from the total history 310 to the captured information 300. With the hierarchical structure, these missing points can be assigned a transformation consistent with nearby observed data. Finally, it is natural to have hierarchical motion structure since semi-rigid object usually share transformations across large portions of the object.

III.B.1. Hierarchical Motion Model

Figure 5:
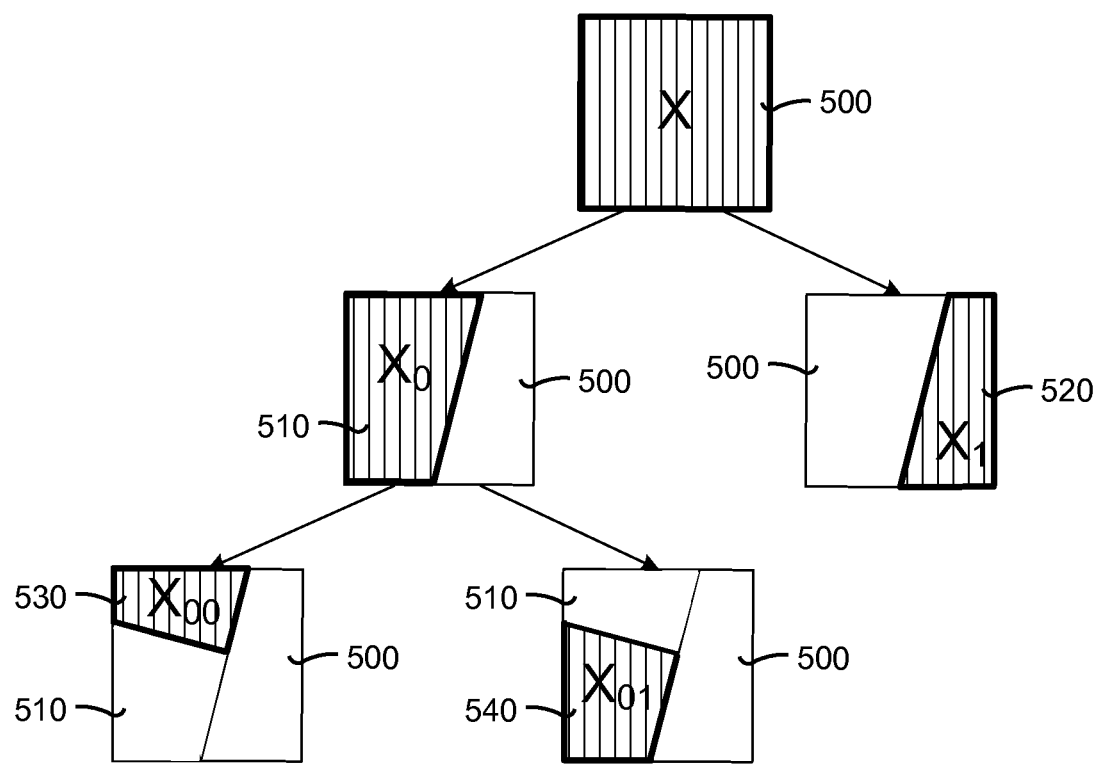
FIG. 5 is a block diagram illustrating an example of a hierarchical motion model used by embodiments of the transformation module shown in FIG. 3.

Some embodiments of the transformation module 320 use a hierarchical motion model. FIG. 5 is a block diagram illustrating an example of a hierarchical motion model used by embodiments of the transformation module 320 shown in FIG. 3. As shown in FIG. 5, warping is estimated first for a large block of information 500 (X). This large block of information 500 then is split into sub-regions as children nodes. These sub-regions are represented in FIG. 5 as a first sub-region 510 ($X_0$) and a second sub-region 520 ($X_1$).

Some of the sub-regions then may be split even further to provide a local refinement of the warping. If further splitting of a sub-region is needed, then the sub-region to be split is divided into children nodes. In FIG. 5 it can be seen that in this example the first sub-region 510 has been further split.

In particular, the first sub-region 510 has been split into a first split region 530 ($X_{00}$) and a second split region 540 ($X_{01}$). Note that in the example of FIG. 5 the second sub-region 520 does not require further splitting. Moreover, it should be noted that although the first sub-region is shown as being divided into two regions, any other integer number of divisions may be used.

Let n denote a node in the tree representing the hierarchical partition. Let $X_n(t-1)$ denote the region corresponding to node n in the domain of the total history up to time (t−1). Let $G_n$ be a rigid (or affine) transformation over the region. Let X=(x,y,z,r,g,b, ... )=(x,c, ... ) denote a colored point in the region. Let $$d(G, X, U) = \arg\min_{X' \in U} \{\alpha \|Gx - x'\| + \beta \|c - c'\| + \ldots \}$$

denote the distortion between GX and a matching point X' in U. Let $D_n G_n = \Sigma_{x \in x_n(t-1)} k(X) d(G_n, X, U(t))$ denote the total distortion in the region, where k(X) is a function to remove outliers, either 0 or 1. If n is a non-leaf region, let $a_n$ be a split of the region into sub-regions.

The hierarchical transformation can be determined by growing the tree from the root as follows: Set node n to the root and apply the following recursive procedure to n:

Step 1. Perform a robust iterative closest point (ICP) algorithm to match the points X in $X_n(t-1)$ to points in U(t) by finding $G_n$ to minimize $D_n(G_n)$.

Step 2. Find a candidate split $a_n$ to split n into child nodes $n_0$ and $n_1$. (Return if no adequate split is found.)

Step 3. Optimize $D_{n_0}(G_{n_0})$ and $D_{n_1}(G_{n_1})$ as in Step 1.

Step 4. Comparing the decrease in distortion $\Delta D = D_n(G_n) - D_{n_0}(G_{n_0}) - D_{n_1}(G_{n_1})$ to a threshold $\Delta R$.

Step 5. Return without splitting (making node n a leaf) if $\Delta D \leq \Delta R$; else split the node using the candidate split $a_n$ and recursively perform the procedure on $n_0$ & $n_1$.

The following sections describe the matching module 330 used in Step 1 and the split/partition module 340 used in Step 2.

III.B.2. Matching Module

Embodiments of the transformation module 320 include the matching module 330. In general, the matching module 330 estimates a match between two data sets, such as the total history 310 and the captured information 300. The match then implies the rigid (or affine) transformation $G_n$ that minimizes $D_n(G_n)$. The matching module 330 uses one of two processes to perform the match estimation. Both of embodiments of the matching module 330 are discussed below.

The two embodiments of the match estimation are similar to each other in many respects. First, each of these two processes gives consideration to both color information and spatial location. Second, both find set of matched pairs. Third, both processes use an update matching distance threshold. Finally, both processes update the transformation based on matched pairs.

III.B.2.i. First Embodiment of the Matching Module

Figure 6:
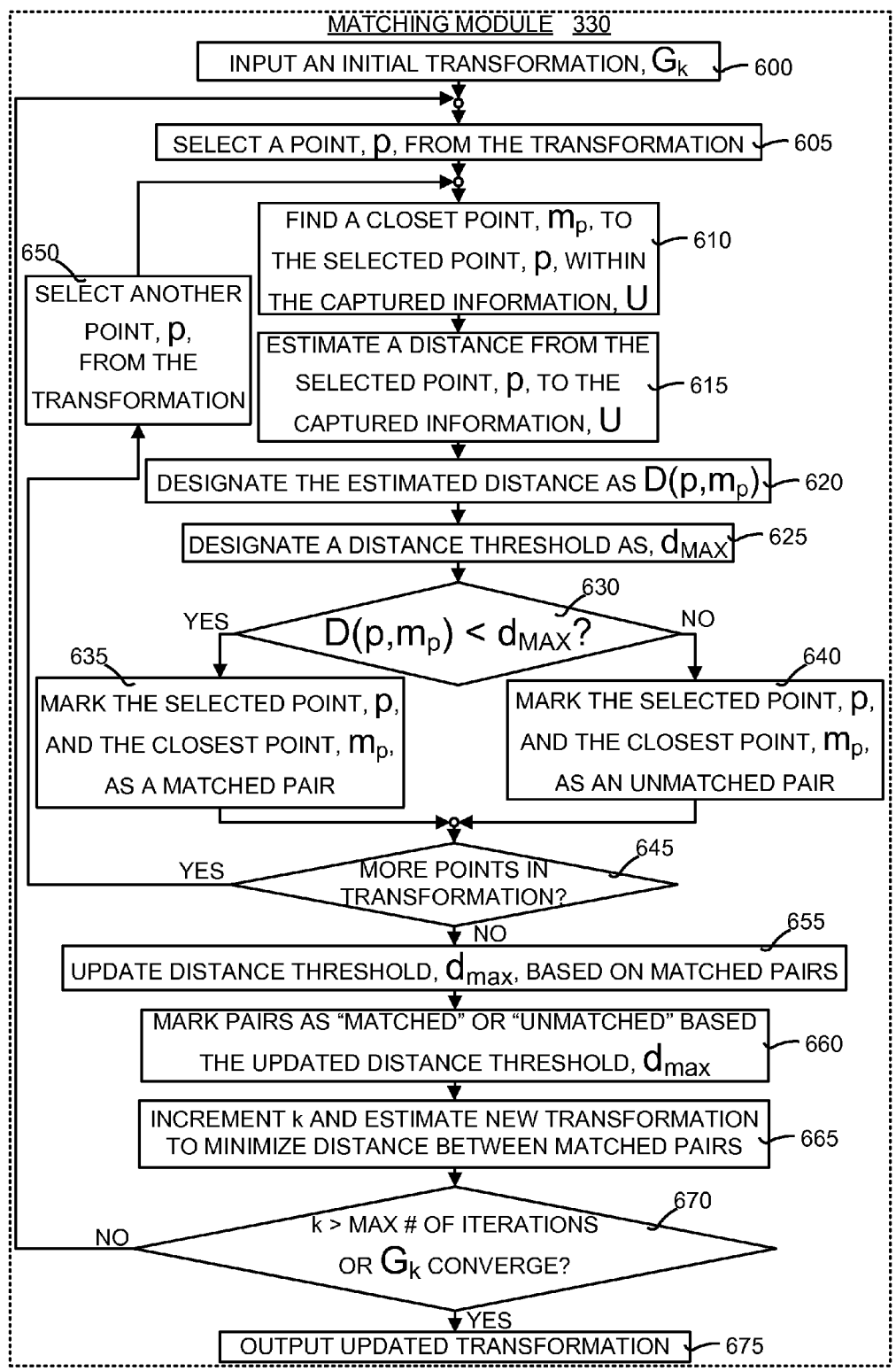
FIG. 6 is a flow diagram illustrating the operational details of a first embodiment of the matching module shown in FIG. 3.

FIG. 6 is a flow diagram illustrating the operational details of a first embodiment of the matching module 330 shown in FIG. 3. The operation begins by inputting an initial transformation, $G_k$ with k=1 (box 600). Mathematically, the objective function of the initial (and subsequent) transformations can be represented as:

$$G_n = \arg\min_G \sum_{X \in X_n(t-1)} k(X) d(G, X, U(t))$$

where, X=(x,y,z,r,g,b, ... )=(x,c, ... ) is a colored point (x,c) in this embodiment of the matching module 330.

In addition, the function k(X) is used to discard outliers, which are 1/0 in this embodiment of the matching module 330. Moreover, the term, $$d(G, X, U) = \arg\min_{X' \in U} \{\alpha \|Gx - x'\| + \beta \|c - c'\| + \ldots \}.$$

Next, a point, p, is selected from the set points in $X_n(t-1)$ transformed by $G_k$, namely $G_n X_n(t-1)$ (box 605). A closest point, mp, to the selected point, p, then is found within the captured information U (box 610). This embodiment of the module 330 then estimates a distance from the selected point, p, to the captured information, U (box 615). This estimated distance is designated as D(p,mp) (box 620).

Embodiments of the module 330 then designate a distance threshold, $d_{MAX}$ (box 625). The distance threshold may be designated by the system 100 or by a user. A determination then is made as to whether the estimated distance is less than the distance threshold (box 630). If so, then the selected point and the closest point are marked as a matched pair (p,mp) (box 635). If not, then the selected point and the closest point are marked as an unmatched pair (box 640).

A determination then is made as to whether there are any point remaining in the transformation (box 645). If so, then another point, p, is selected from the transformation (box 650). If not, then the distance threshold is updated based on the matched pairs that have been found (box 655). The pairs are again marked as either "matched" or "unmatched" based on the updated distance threshold (box 660).

This first embodiment of the module 330 then increments k and estimates a new transformation, $G_k$, to minimize the distance between matched pairs (box 665). A determination then is made as to whether the number of transformations, k, is greater than a maximum number of iterations or whether $G_k$ has converged (box 670). If not, then the process begins again with a new transformation. Otherwise, the updated transformation is output (box 675).

III.B.2.ii. Second Embodiment of the Matching Module

Figure 7:
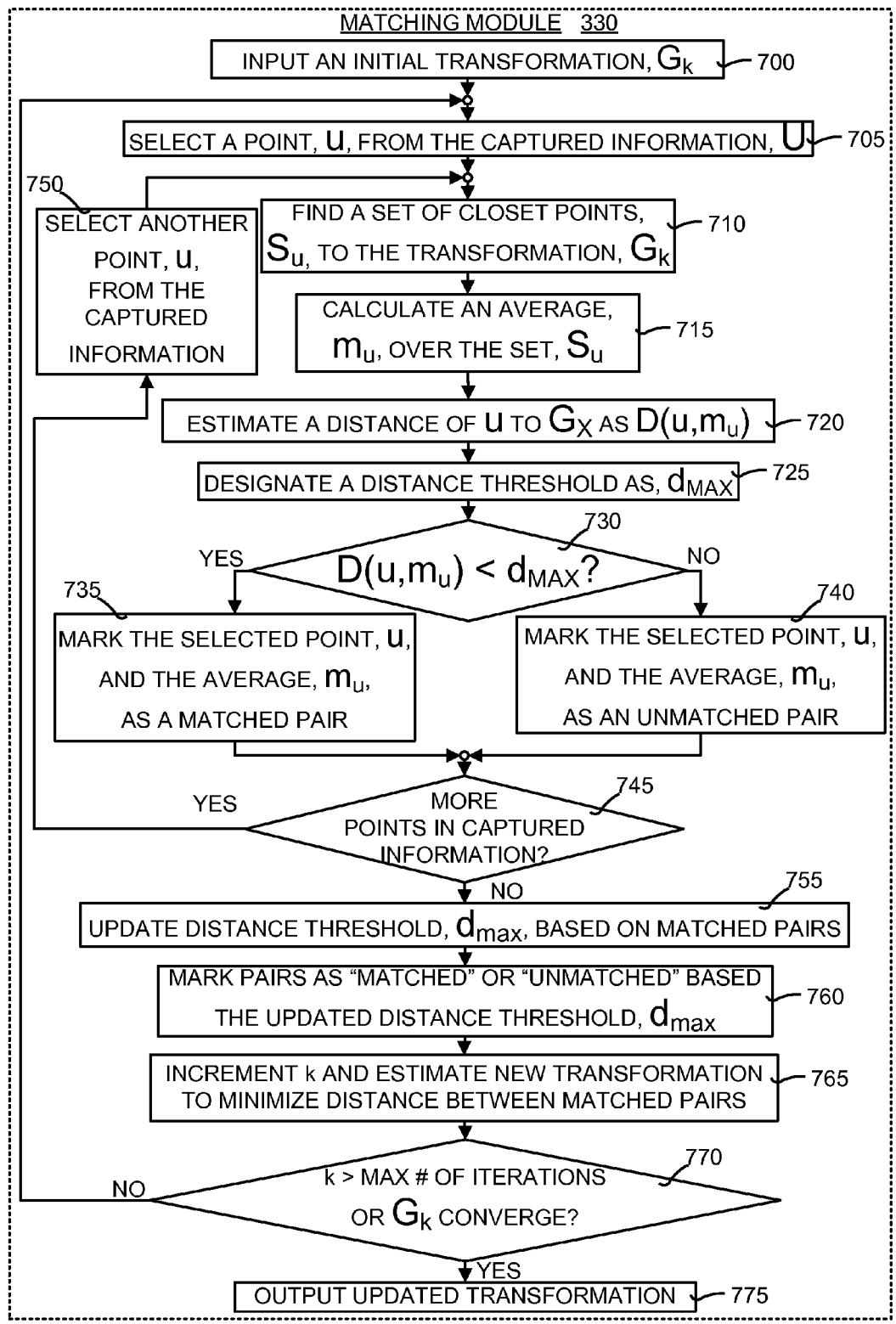
FIG. 7 is a flow diagram illustrating the operational details of a second embodiment of the matching module shown in FIG. 3.

FIG. 7 is a flow diagram illustrating the operational details of a second embodiment of the matching module 330 shown in FIG. 3. This second embodiment differs from the first embodiment in that is takes an average over set of closer points. This can help to deal with the noisy data, especially when the merge algorithm is less than desirable and there are several noisy points accumulated around a surface.

As shown in FIG. 7, the operation begins by inputting an initial transformation, $G_k$ with k=1 (box 700). Next, a point, u, is selected from the captured information, U (box 705). A set of closest points, $S_u$, in the transformation, $G_k$ (box 710). An average, $m_u$, then is calculated over the set of closest points (box 715).

This embodiment of the module 330 then estimates a distance from the selected point, u, to the transformation, $G_k$ (box 720). This estimated distance is designated as $D(u,m_u)$. A distance threshold then is designated as $d_{MAX}$ (box 725). As noted above, the distance threshold may be designated by the system 100 or by a user.

A determination then is made as to whether the estimated distance is less than the distance threshold (box 730). If so, then the selected point and the average are marked as a matched pair $(u,m_u)$ (box 735). If not, then the selected point and the average are marked as an unmatched pair (box 740). A determination then is made as to whether there are any point remaining in the captured information (box 745). If so, then another point, u, is selected from the captured information (box 750). If not, then the distance threshold is updated based on the matched pairs that have been found (box 755). The pairs are again marked as either "matched" or "unmatched" based on the updated distance threshold (box 760).

This second embodiment of the module 330 then increments k and estimates a new transformation, $G_k$, to minimize the distance between matched pairs. A determination then is made as to whether the number of transformations, k, is greater than a maximum number of iterations or whether $G_k$ has converged (box 770). If not, then the process begins again with a new transformation. Otherwise, the updated transformation is output (box 775).

III.B.3. Split/Partition Module

Embodiments of the transformation module 320 also include the split/partition module 340. The split/partition module 340 performs a splitting process after embodiments of the matching module 330 finish matching from a region X to U. In general, the split/partition module 340 verifies matched and unmatched regions, partitions them into several child nodes, and then refines each region. In some situations there is no need to perform further splits, such as when there are few points in the region.

Figure 8:
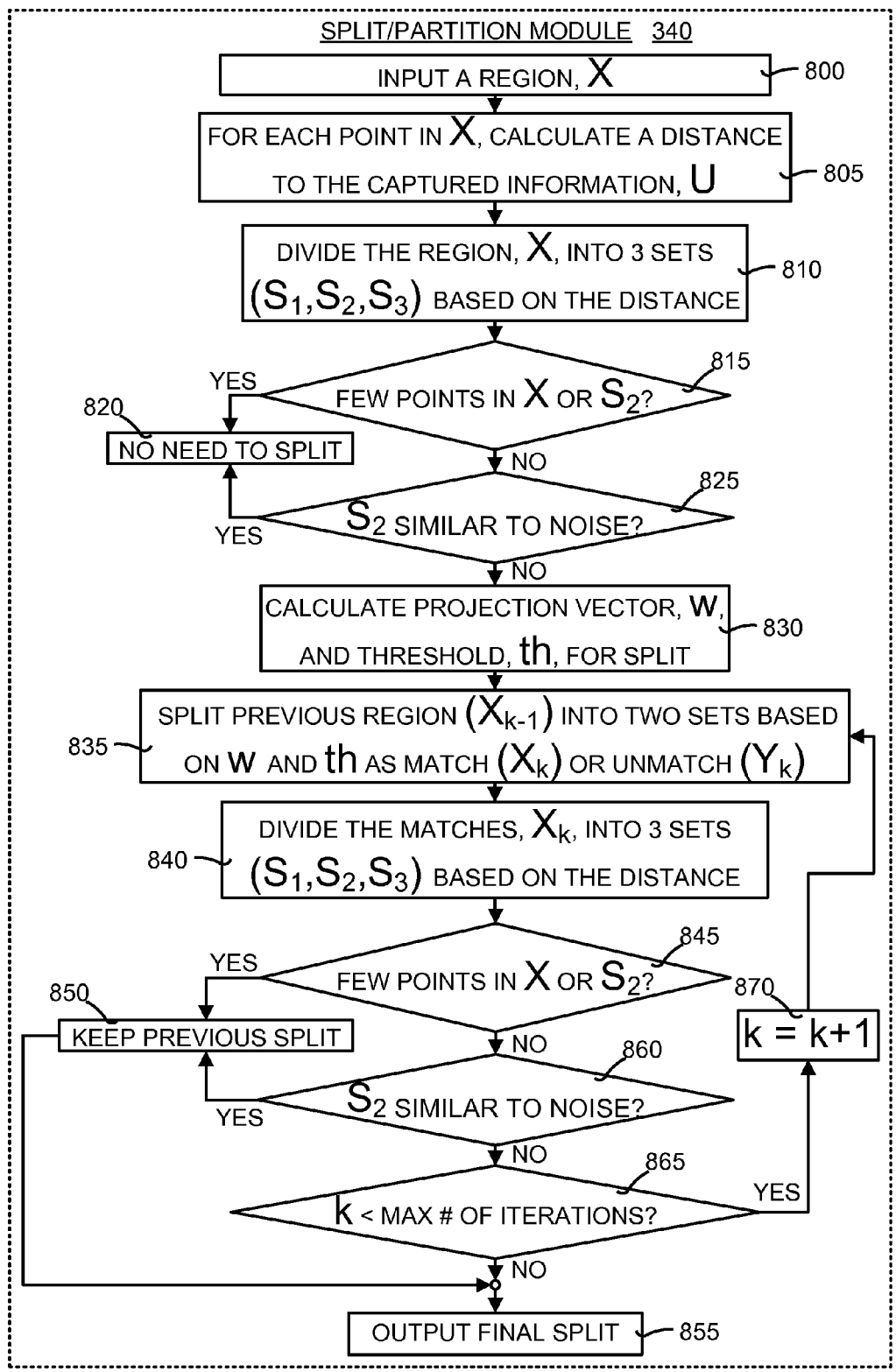
FIG. 8 is a flow diagram illustrating the operational details of embodiments of the split/partition module shown in FIG. 3.

FIG. 8 is a flow diagram illustrating the operational details of embodiments of the split/partition module 340 shown in FIG. 3. The operation begins by inputting a region, X (box 800). For each point in the region, embodiments of the module 340 calculate a distance from the point to the captured information, U (box 805). Next, the region is divided into sets based on the computed distance (box 810). In some embodiments, the module divides the region into three sets, designated as $S_1$, $S_2$, and $S_3$.

A point threshold then is defined, and a determination then is made as to whether there are few points in the region, X, or in $S_2$ as compared to the point threshold (box 815). If so, then there is no need to split the region and the module 340 is exited (box 820). If not, then a determination is made as to whether $S_2$ is similar to noise (box 825). If so, then again there is no need for a split (box 820).

Otherwise, embodiments of the module 340 calculate a projection vector, W, and a split threshold, th, for the split (box 830). In some embodiments, a Fisher's linear discriminant is used to decide the projection vector and split threshold. The previous region, $X_{k-1}$, is split into two sets based on the projection vector and the threshold (box 835). These two sets are a match set, $X_k$, and an unmatched set, $Y_k$.

It is possible for the node to have non-linear split between matched and unmatched points. Therefore, in embodiments of the module 340 a multiple iterative split is used. This means that another split will be processed on the "matched set" generated in the previous step.

In particular, the match set then is divided into three sets $S_1$, $S_2$, and $S_3$, based on the distance computed above (box 840). A determination then is made as to whether there are few points in the region, X or in $S_2$ (box 845). If so, then there is no need to split the region any further and the previous split is kept (box 850) and the previous split is output as the final split (box 855). If not, then a determination is made as to whether $S_2$ is similar to noise (box 860). If so, then again the previous split is kept (box 850) and output as the final split (box 855).

Otherwise, a determination is made as to whether the number of regions, k, is less than a maximum number of iterations (box 865). If so, then k is set equal to k+1 (box 870) and the new region is processed again, starting with splitting the previous region into two sets based on the projection vector and the threshold (box 835). Otherwise, the current split is output as the final split (box 855).

III.C. Information Merging Module

In general, for each point in the warped history information, X'(t), embodiments of the information merging module 360 will merge that point with a point in the captured information, U(t), as long as there is a match. Otherwise, reasonable points will be kept.

Figure 9:
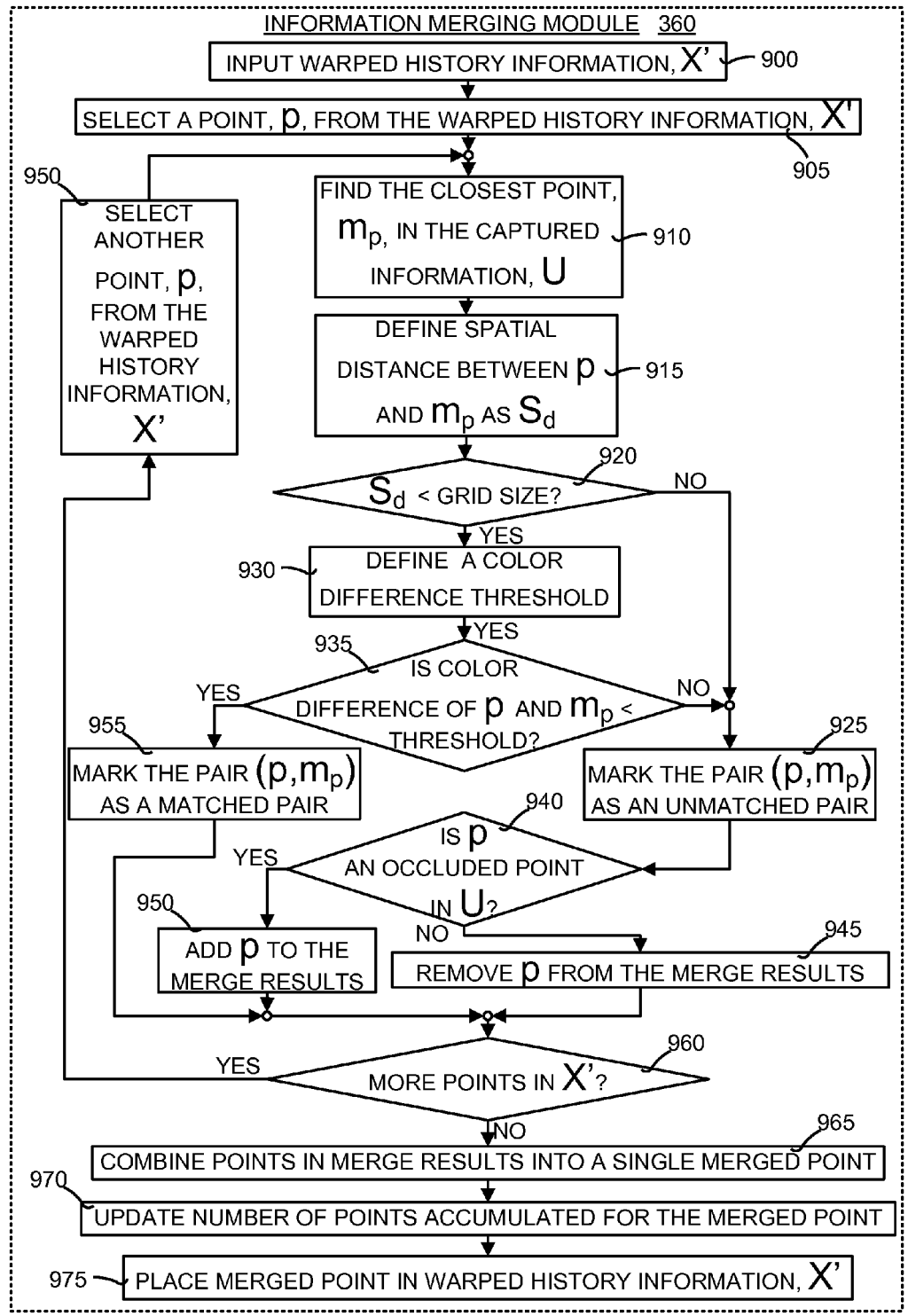
FIG. 9 is a flow diagram illustrating the operational details of embodiments of the information merging module shown in FIG. 3.

FIG. 9 is a flow diagram illustrating the operational details of embodiments of the information merging module 360 shown in FIG. 3. The operation begins by inputting the warped history information (box 900). A point, p, then is selected from the warped history information (box 905). Embodiments of the module 360 then find the closest point, mp, in the captured information (box 910).

A spatial distance between the point and the closest point is defined as $S_d$ (box 915). A determination then is made as to whether the spatial distance is less then a grid size (box 920). If not, then the pair (p,mp) is marked as an unmatched pair (box 925). Otherwise, a color difference threshold is defined (box 930).

A determination then is made as to whether the color difference of the point and the closest point are less than the color difference threshold (box 935). If not, then the pair is marked as an unmatched pair (box 925). A determination then is made as to whether the point is an occluded point in the captured information (box 940). If not, then the point is removed from the merge results (box 945). Otherwise, the point is added to the merge results (box 950).

If the color difference of the point and the closest point are greater than or equal to the color difference threshold (box 935), then the pair is marked as a matched pair (box 955). In both cases, a determination then is made as to whether there are more points in the warped history information (box 960). Embodiments of the module 360 then combine point in the merge results into a single merged point (box 965). The number of points accumulated for the merged point then is updated (box 970), and the merged point is placed in the warped history information (box 975).

Figure 10:
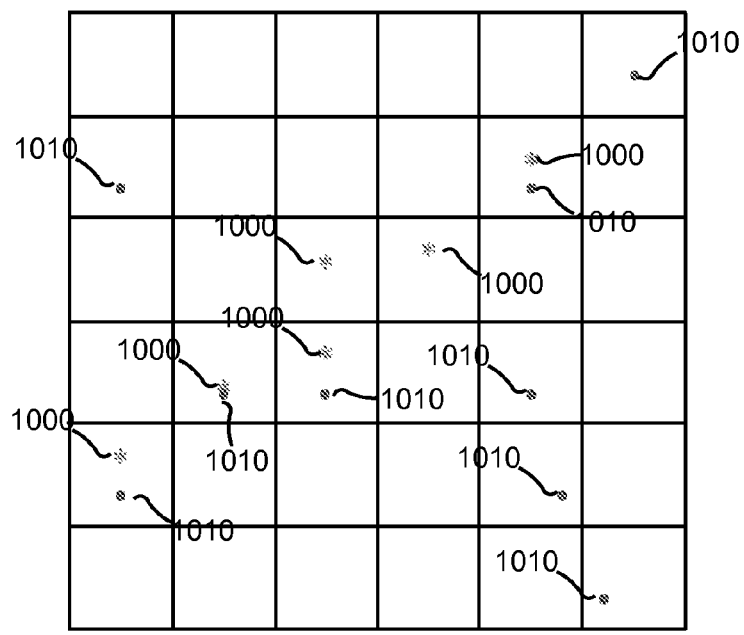
FIG. 10 is a block diagram illustrating an example of the warped history information and the captured information prior to merging.

FIG. 10 is a block diagram illustrating an example of the warped history information, X'(t), and the captured information, U(t), prior to merging. As shown in FIG. 10, the warped history information points 1000 are represented as asterisks, while the captured information points 1010 are represented as squares.

Figure 11:
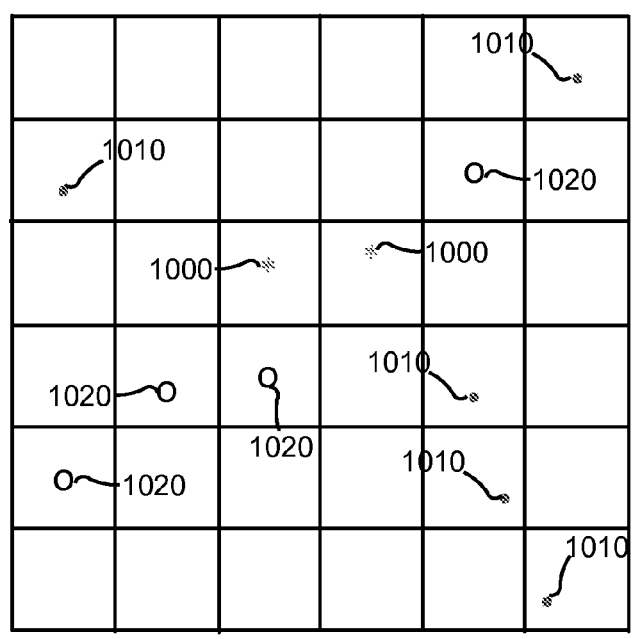
FIG. 11 is a block diagram illustrating the example of the warped history information and the captured information after merging.

FIG. 11 is a block diagram illustrating the example of the warped history information, X'(t), and the captured information, U(t), after merging. After merging, the current information, X(t), is generated. As shown in FIG. 11, the merging process intends to merge points within the same grid and keep those points that are far away from each other. The merged points 1020 shown in FIG. 11 are those warped history information points 1000 and those captured information point 1010 that have been merged.

IV. Exemplary Operating Environment

Figure 12:
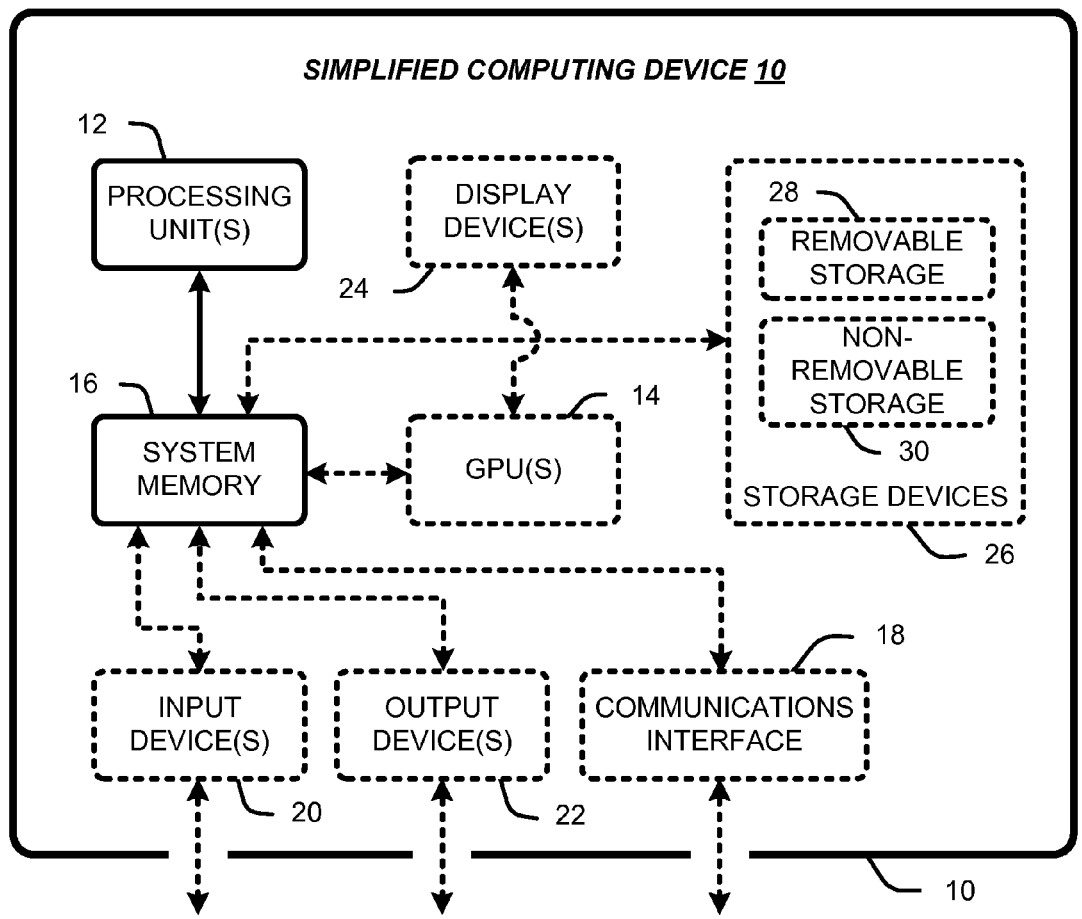
FIG. 12 illustrates a simplified example of a general-purpose computer system on which various embodiments and elements of the temporal information integration dis-occlusion system and method, as described herein and shown in FIGS. 1-11, may be implemented.

Embodiments of the temporal information integration dis-occlusion system 100 and method described herein are operational within numerous types of general purpose or special purpose computing system environments or configurations. FIG. 12 illustrates a simplified example of a general-purpose computer system on which various embodiments and elements of the temporal information integration dis-occlusion system 100 and method, as described herein and shown in FIGS. 1-11, may be implemented. It should be noted that any boxes that are represented by broken or dashed lines in FIG. 12 represent alternate embodiments of the simplified computing device, and that any or all of these alternate embodiments, as described below, may be used in combination with other alternate embodiments that are described throughout this document.

For example, FIG. 12 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the temporal information integration dis-occlusion system 100 and method described herein, the device should have a sufficient computational capability and system memory to enable basic computational operations. In particular, as illustrated by FIG. 12, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 12 may also include other components, such as, for example, a communications interface 18. The simplified computing device of FIG. 12 may also include one or more conventional computer input devices 20 (e.g., pointing devices, keyboards, audio input devices, video input devices, haptic input devices, devices for receiving wired or wireless data transmissions, etc.). The simplified computing device of FIG. 12 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 12 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the temporal information integration dis-occlusion system 100 and method described herein, or portions thereof, may be stored, received, transmitted, or read from any desired combination of computer or machine readable media or storage devices and communication media in the form of computer executable instructions or other data structures.

Finally, embodiments of the temporal information integration dis-occlusion system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing image data, the method comprising:
   receiving, by a computing device, captured image data representing a visual depiction of a scene at a first time;
   receiving, by the computing device, historical image data representing at least one other visual depiction of at least a portion of the scene at at least one other time;
   generating, by the computing device, a virtual view of the scene, including:
      warping at least a portion of the historical image data onto the captured image data according to a motion model, wherein the warping includes:
         estimating the warping for at least a portion of the scene;
         splitting at least the portion of the scene into a plurality of regions according to a recursive region splitting process that employs determinations of matched and unmatched points between the captured image data and the historical image data; and
         performing a local refinement of the estimated warping on a per-region basis; and
   outputting the generated virtual view of the scene.

2. The method of claim 1, wherein the historical image data was captured by a camera or is from a model of the scene.

3. The method of claim 1, wherein:
   the captured image data includes a first visual depiction of a non-rigid object within the scene;
   the historical image data includes at least one other visual depiction of the non-rigid object; and
   the warping includes warping the at least one other visual depiction of the non-rigid object onto the first visual depiction of non-rigid object according to the motion model.

4. The method of claim 1, wherein the warping also includes:
   selecting a point represented in the captured image data;
   finding a set of closest points in the captured image data to a transformation;
   computing an average over the set of closest points;
   estimating a distance between the selected point and the transformation;
   determining whether the distance is less than a distance threshold; and
   marking the selected point and the average as a matched pair if the distance is less than the distance threshold.

5. The method of claim 1, wherein the warping also includes:
   selecting a region;
   calculating distances from points in the region to the captured image data; and
   determining, based on a number of points in the region relative to a point threshold, whether the warping is to be performed based on estimated matches or on verifications of estimated matches.

6. The method of claim 1, wherein the warping also includes:
   determining whether an initial warping is to be refined based on an iterative closest point analysis.

7. The method of claim 1, wherein generating the virtual view of the scene further includes:
   merging the warped historical image data with the captured image data.

8. The method of claim 1, further comprising:
   updating the historical image data with the current image data.

9. A computer storage device, storing computer-executable instructions for performing operations that process image data, the operations comprising:
   receiving captured image data that represents a visual depiction of a non-rigid subject at a first time;
   receiving, by the computing device, historical image data representing at least one other visual depiction of at least a portion of the non-rigid subject at at least one other time;
   generating a virtual view of the scene, including:
      warping at least a portion of the historical image data onto the captured image data according to a hierarchical transformation, including:
         estimating the warping for at least a portion of the scene;
         splitting at least the portion of the scene into a plurality of regions according to a recursive region splitting process that is based on differences between the captured image data and the historical image data; and
         performing a local refinement of the estimated warping on a per-region basis; and
   outputting the generated virtual view of the non-rigid subject.

10. The computer storage device of claim 9, wherein the historical image data is from a model of the non-rigid subject.

11. The computer storage device of claim 9, wherein the warping also includes:
    selecting a point of the non-rigid subject that is represented in the captured image data;
    finding a set of closest points in the captured image data to a transformation;
    computing an average over the set of closest points;
    estimating a distance between the selected point and the transformation; and
    determining whether the selected point and the computed average are matched based on a value of the estimated distance relative to a distance threshold.

12. The computer storage device of claim 9, wherein the warping also includes:
    determining whether the warping is to be performed based on estimated matches or with verification of estimated matches.

13. The computer storage device of claim 9, wherein the warping also includes:
    determining, on a per-region basis, whether the estimated warping is to be refined.

14. The computer storage device of claim 9, wherein generating the virtual view of the scene further includes:
    merging the warped historical image data with the captured image data.

15. The computer storage device of claim 9, wherein the operations further comprise:
    updating the historical image data with the current image data.

16. A device for processing image data, the device comprising:
    a memory and a processing unit, wherein the memory and the processing unit are respectively configured to store and execute instructions for performing operations, the operations including:
       receiving image data representing a visual depiction of a non-rigid object at a first time;

receiving historical image data representing at least one other visual depiction of at least a portion of the non-rigid object at at least one other time;

generating a virtual view of the non-rigid object, including:

warping at least a portion of the received historical image data onto the received image data according to a motion model, including:

estimating the warping for at least a portion of the visual depiction;

splitting at least the portion of the visual depiction into a plurality of regions according to a recursive region splitting process; and performing a local refinement of the estimated warping on a per-region basis; and merging the warped historical image data with the received image data; and outputting the generated virtual view of the non-rigid object.

17. The device of claim 16, wherein the warping also includes:

computing an average of a set of points that are represented in the received image data;

estimating a distance between a selected point of the non-rigid object that is represented in the received image data and a transformation; and determining whether the selected point and the computed average are matched based on a value of the estimated distance relative to a distance threshold.

18. The device of claim 16, wherein the warping also includes:

determining, based on a number of points in a selected region, whether the region is to be split into sub-regions.

19. The device of claim 16, wherein the warping also includes:

determining whether an initial warping is to be refined.

20. The device of claim 16, wherein generating the virtual view of the non-rigid object further includes:

determining whether a selected point in the warped historical image data and another point in the received image data are matched based on a spatial distance.

* * * * *